(12) United States Patent
Jakobsson

(10) Patent No.: US 6,330,778 B1
(45) Date of Patent: Dec. 18, 2001

(54) BEAM ARRANGEMENT

(75) Inventor: Bertil Jakobsson, Nykvarn (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/255,462

(22) Filed: Feb. 22, 1999

(30) Foreign Application Priority Data

Feb. 26, 1998 (SE) .................................................. 9800573

(51) Int. Cl.[7] .................................................. E04C 3/30
(52) U.S. Cl. ........................ 52/729.1; 296/204; 296/182; 296/183
(58) Field of Search ................. 52/729.1, 729; 296/204, 182, 183

(56) References Cited

U.S. PATENT DOCUMENTS 2,739,822 * 3/1956 Schilberg ............................. 280/106
4,446,668 * 5/1984 Janer ..................................... 52/729
5,553,437 * 9/1996 Navon ................................ 52/729.1

* cited by examiner

Primary Examiner—Carl D. Friedman
Assistant Examiner—Chi Q. Nguyen
(74) Attorney, Agent, or Firm—Ostrolenk, Faber, Gerb & Soffen, LLP

(57) ABSTRACT

The invention refers to a beam arrangement for a vehicle. This beam arrangement is designed to extend between and connect two frame side members (2,3) which extend in the longitudinal direction of the vehicle. The beam arrangement includes two side portions (7,8) which extend substantially vertically, and a connecting portion (9) which connects the side portions. The side portions (7,8) converge, as seen from above, in each of the end regions (4,5) of the beam arrangement towards a point situated in a central region of the beam arrangement which comprises less than 20% of the total length of the beam arrangement.

12 Claims, 2 Drawing Sheets

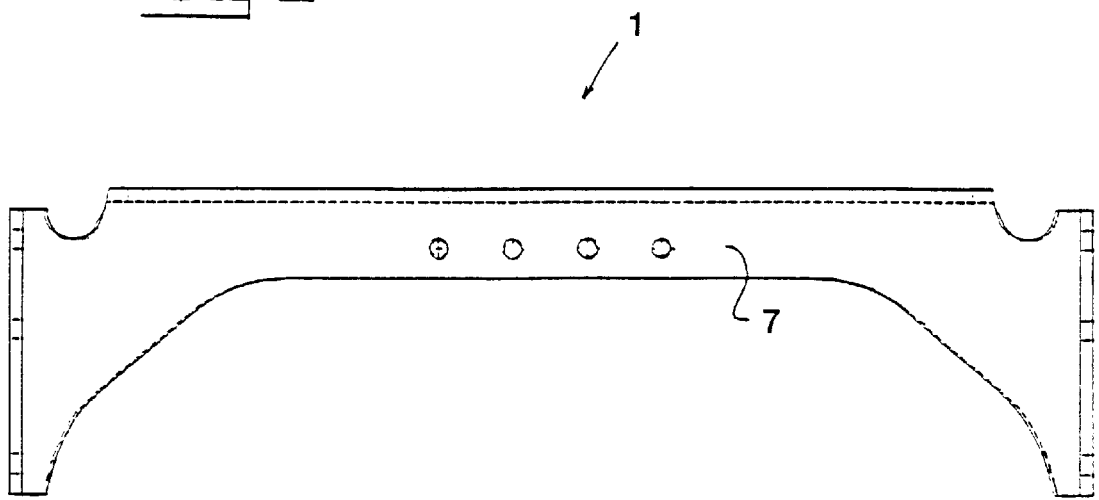
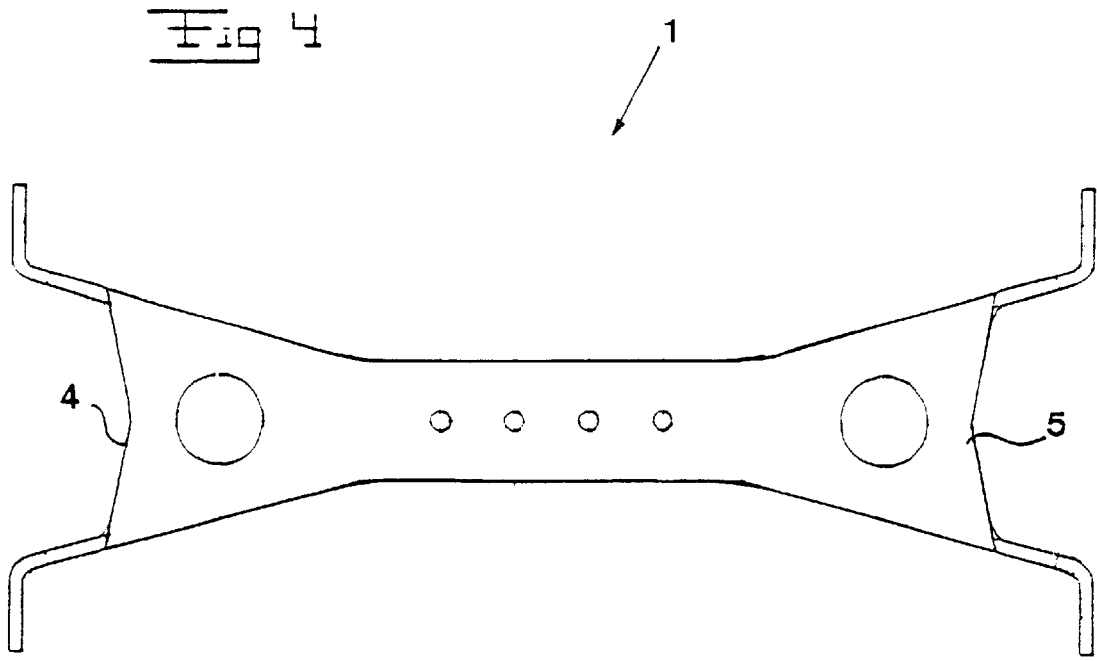

BEAM ARRANGEMENT

The present invention relates to a beam arrangement for extending between side frame members of a vehicle, wherein the beam is shaped for begin strengthened.

STATE OF THE ART

Beam arrangements are used as cross-members in heavy-duty motor vehicles such as trucks, buses etc. or in trailer vehicles in order to connect two longitudinal frame side members to one another. Known cross-members usually have the same cross-sectional shape along substantially the whole of their length and have little capacity for withstanding the forces which tend to displace the frame side members relative to one another in the longitudinal direction of the vehicle, i.e. in such a manner that one of the frame side members moves forward in the longitudinal direction, while the other frame side member moves, relatively speaking, rearwards in the longitudinal direction.

A known solution to this problem is to brace the vehicle framework with so-called cross-braces, i.e. at least two bars or members which extend diagonally from one frame side member to the other frame side member in such a way as to form, as seen from above, a cross between the side members. This cross-brace limits the longitudinal movement of the side members but occupies a relatively large amount of space and increases the cost and total weight of the framework.

U.S. Pat. No. 1,928,942 refers to a beam arrangement of the type mentioned in the introduction which is intended for a vehicle and designed to extend between and connect two frame side members to one another. That beam arrangement includes two vertical side portions and two horizontal connecting portions which connect the side portions to one another. In each of the end regions of that beam arrangement, the side portions converge towards each other. These end regions comprise only a small proportion of the total length of the beam arrangement, which means that there are two convergence points situated at a relatively short distance from one another. A vehicle frame provided with said beam arrangement entails the same problem as in a vehicle frame with a conventional cross-member and therefore requires a cross-brace for limiting longitudinal movements of the side members relative to one another.

OBJECT OF THE INVENTION

The object of the present invention is to obviate the aforesaid problem and provide a beam arrangement which contributes to improved rigidity of the vehicle's framework and has a better capacity for preventing displacement of the frame side members relative to one another in the longitudinal direction of the vehicle. To this end, the invention is distinguished by the beam arrangement including first and second side portions which extend between and are attached to separated frame side members of a vehicle. The side portions are spaced apart from each other along the length of the frame members. Each side portion is in a vertical plane. There are end regions of the beam arrangement toward each of the frame side members, an intermediate region between the end regions, and a central region in the intermediate region. Each side portion converges toward the other one form a frame side member toward the intermediate portion.

Since the side portions, as seen from above in the solution according to the invention, converge in each of the end regions of the beam arrangement towards a point situated in a central region of the beam arrangement, which central region comprises less than 20% of the total length of the beam arrangement, the result is a beam arrangement in which a first assemblage of two diametrically opposite side portions replaces one member of a cross-brace, and a second assemblage of two diametrically opposite side portions replaces the other member of a cross-brace. The beam arrangement according to the invention thus extends between the frame side members, acts both as cross-member and as cross-brace and effectively improves the rigidity and stability of the framework.

In an advantageous embodiment of the invention, the side portions converge towards a point which is substantially common to both of the end regions. Particularly good rigidity is achieved if diagonally opposite side portions of the beam arrangement, as seen from above, extend along a substantially common line.

According to a further embodiment of the invention, the side portions in an intermediate region of the beam arrangement between said end regions are substantially parallel with one another. In this case, the beam arrangement in at least the intermediate region may be U-shaped in cross-section. It is advantageous if the connecting portion extends along the whole of the intermediate region and along at least part of each end region. The connecting portion may extend in a substantially horizontal plane.

In another embodiment of the invention, each side portion incorporates a mounting flange arranged to extend substantially parallel with at least part of said frame side members.

In a further embodiment of the invention, the beam arrangement is manufactured in the form of one piece of material, consisting preferably of a metal plate which is processed plastically and is between 5 and 15 mm thick. Such a single piece of material results in great strength of the beam arrangement itself and may simplify manufacture in that no welding is required for assembling various beam portions.

Other features distinguishing the invention are indicated in the attached patent claims and the ensuing description of an embodiment exemplifying the invention with reference to the attached drawings.

BRIEF DESCRIPTION OF THE DRAWINGS

FIG. 3 shows a side view of the beam arrangement.

FIG. 4 shows a view from above of the beam arrangement.

DESCRIPTION OF EMBODIMENTS

Figure 1:
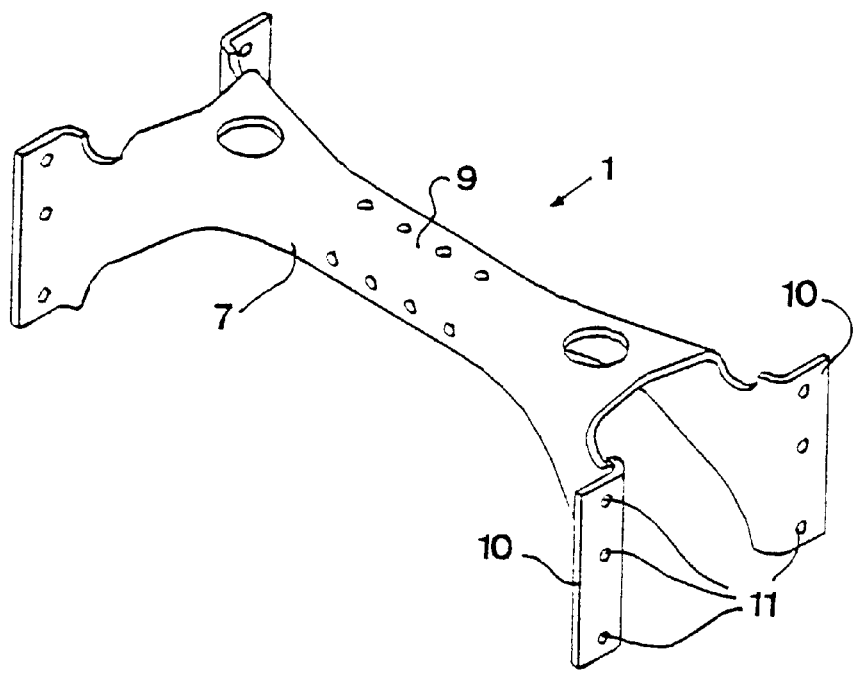
FIG. 1 shows a perspective view of a beam arrangement according to the invention.
Figure 2:
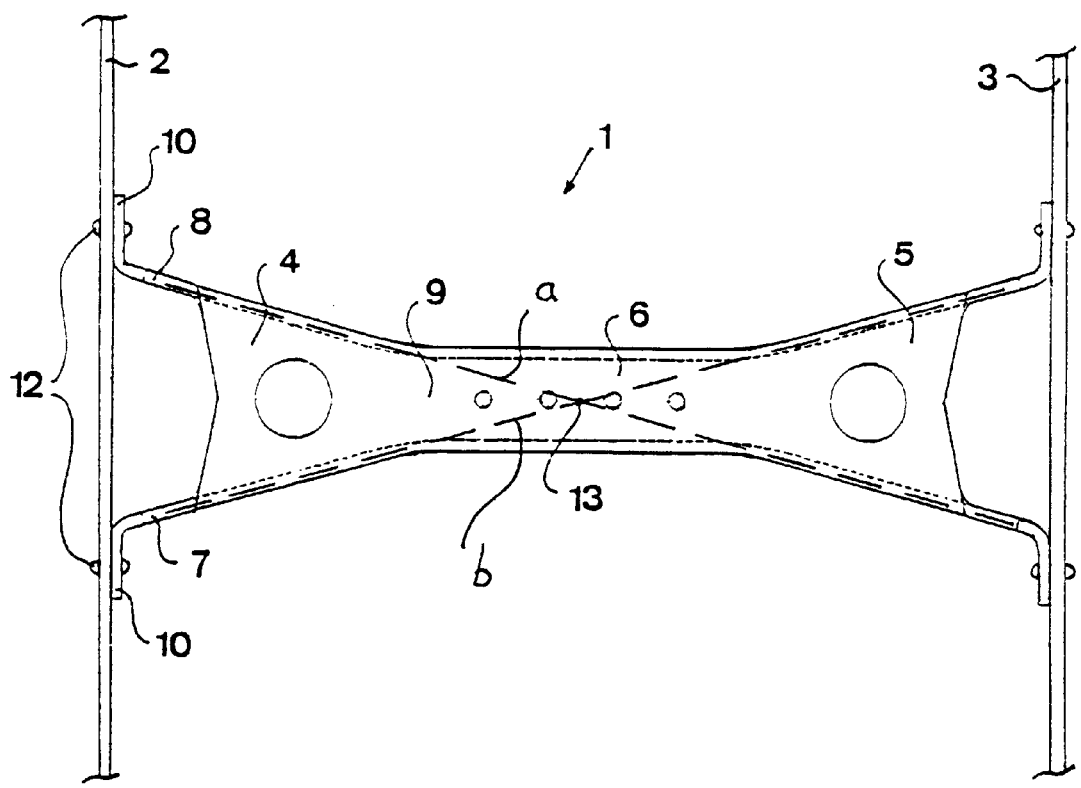
FIG. 2 shows a view from above of the beam arrangement fitted between two frame side members.

FIGS. 1–4 depict a beam arrangement intended for fitting as a cross-member 1 between two longitudinal frame side members 2,3 of a vehicle, e.g. a heavy-duty motor vehicle such as a truck or a bus. The frame side members usually consist of a web plate and two flanges, but for the sake of simplicity the drawings only show the web plates. The cross-member 1 includes two end regions 4,5 and an intermediate region 6 which extends between the two end regions 4 and 5. The cross-member 1 further has a U-shaped cross-sectional profile and includes two side portions 7,8 which extend substantially vertically when the cross-member 1 is fitted in a vehicle which is in a normal travelling posture. The cross-member 1 further includes a connecting portion 9 which, in said normal travelling posture, extends in a substantially horizontal plane and connects the two side portions 7,8 to one another. The connecting portion 9 is situated with advantage at the same level as the top of the side members. The connecting portion 9 extends along the whole of the intermediate region 6 and along part of the end regions 4,5, i.e. the connecting portion 9 ends at a distance from the outer ends of the cross-member 1. Each side portion 7,8 further includes at each of its ends a mounting flange 10 arranged in such a way as to extend substantially parallel with and abut against a frame side member 2,3. The mounting flange 10 consists of a bent end section of the respective outer end of each side portion 7,8. Each mounting flange 10 incorporates a number of holes 11 to accommodate bolting devices 12 by means of which the cross-member 1 is assembled to the frame side members 2,3.

The cross-member 1 is manufactured as a single piece of material consisting preferably of a metal plate cut to appropriate shape and thereafter processed plastically to the final shape of the cross-member. The metal plate is preferably between 5 and 15 mm thick.

The two side portions 7,8 extend in the intermediate region 6 substantially parallel with one another as seen from above. In each of the end regions 4,5 of the cross-member 1, the side portions 7,8 converge towards a point 13 situated in a central region of the cross-member which comprises less than 20% of the total length of the cross-member 1. The two side portions 7,8 preferably converge towards a common point 13 for both of the end regions 4,5. Moreover, diagonally opposite side portions 7,8 of the two end regions 4,5 of the cross-member 1 extend along substantially common lines a and b respectively, as seen from above (see FIG. 2). In this way the side portions 7,8 form a so-called cross-brace.

The present invention is not limited to the embodiment depicted but may be varied and modified within the scope of the patent claims below. For example, it should be noted that the cross-member 1 need not have a U-shaped cross-sectional profile and that the connecting section 9 may be situated in a different position relative to the side portions 7,8. It is also possible to provide the cross-member with two preferably parallel connecting portions. The frame side members 2,3 are depicted only schematically in FIG. 2 and may have many different cross-sectional profiles, but preferably at least one beam section which in said normal travelling posture is substantially vertical.

What is claimed is:

1. A beam arrangement for connecting between two separated frame side members in a vehicle, wherein the side members extend in a longitudinal direction of the vehicle, the beam arrangement comprising:

a first and a second side portion which are separated from each other along the frame side members, each side portion connected between both of the frame side members, each side portion being shaped to extend in a substantially vertical plane;

a connecting portion connecting the separated side portions;

the beam arrangement including end regions toward the frame side members and a central region between the frame side members;

each of the side portions extending in from both of the frame side members toward the central region;

at each end region of the beam arrangement, each side portion converging generally toward the other side portion inward from both of the frame side members and toward the central region of the beam arrangement, and each of the side portions in one end region extends along a substantially common line with the diagonally opposite part of the other side portion in the other end region;

at the central region, the side portions remaining spaced apart, wherein each of the side portions converges from both of the frame side members through both end regions and toward the central region and converges in a direction toward a point situated in the central region of the beam arrangement which point is substantially common to both end regions and the side portions converge toward each other;

the beam arrangement further including an intermediate region between the end regions, the side portions converging to the intermediate region and extending substantially parallel and spaced apart in the intermediate region; at least the intermediate region of the beam arrangement is U-shaped in cross-section with the connecting portion defining the closed end of the U and the side portions defining the legs of the U.

2. The beam arrangement of claim 1, wherein the central region comprises less than 20% of the total length of the beam arrangement between the frame side members.

3. The beam arrangement of claim 1, wherein each side portion in each of the end regions extends along a substantially straight line.

4. The beam arrangement of claim 3, wherein the central region comprises less than 20% of the total length of the beam arrangement between the frame side members.

5. The beam arrangement of claim 1, wherein the central region comprises less than 20% of the total length of the beam arrangement between the frame side members.

6. The beam arrangement of claim 1, wherein the connecting portion extends along the entire intermediate region and along at least part of each end region toward the frame side members.

7. The beam arrangement of claim 1, wherein the connecting portion extends along the entire intermediate region and along at least part of each end region toward the frame side members.

8. The beam arrangement of claim 7, wherein the connecting portion extends in a substantially horizontal plane.

9. The beam arrangement of claim 1, wherein each side portion in each of the end regions extends along a substantially straight line.

10. The beam arrangement of claim 1, wherein the beam arrangement includes an intermediate region between the end regions, the side portions converge to the intermediate region and extend substantially parallel and spaced apart in the intermediate region.

11. The beam arrangement of claim 1, wherein each side portion has an end with a mounting flange thereon which extends substantially parallel with an adjacent part of the frame side member.

12. The beam arrangement of claim 1, wherein the central region comprises less than 20% of the total length of the beam arrangement between the frame side members.

* * * * *